United States Patent
Ganesh et al.

(10) Patent No.: US 6,691,139 B2
(45) Date of Patent: *Feb. 10, 2004

(54) RECREATION OF ARCHIVES AT A DISASTER RECOVERY SITE

(75) Inventors: Shivaji Ganesh, Milpitas, CA (US); Ramesh Kavanappillil, Cupertino, CA (US)

(73) Assignee: Hewlett-Packard Development Co., Ltd., Houston, TX (US)

(*) Notice: Subject to any disclaimer, the term of this patent is extended or adjusted under 35 U.S.C. 154(b) by 303 days.

This patent is subject to a terminal disclaimer.

(21) Appl. No.: 09/774,839

(22) Filed: Jan. 31, 2001

(65) Prior Publication Data

US 2002/0103816 A1 Aug. 1, 2002

(51) Int. Cl.[7] .......................... G06F 11/00; G06F 12/00
(52) U.S. Cl. .......................... 707/204; 714/13; 714/15
(58) Field of Search ............... 707/1–2, 7, 100–101, 707/200, 204–205; 714/13–15; 711/3, 100, 143

(56) References Cited

U.S. PATENT DOCUMENTS 5,890,165 A * 3/1999 Boudrie et al. ............. 707/202
6,035,412 A * 3/2000 Tamer et al. ................. 714/6
2002/0091718 A1 * 7/2002 Bohannon et al. .......... 707/202

OTHER PUBLICATIONS

Roby Sherman, "Implementing an Automated Standby Database", Oracle Magazine, May 1999.

Biju Thomas, "Using Oracle8i's New Log–Analysis Tool", Oracle Magazine, Sep. 1999.

* cited by examiner

Primary Examiner—Alford Kindred

(57) ABSTRACT

A method for creating a standby data processing system located at a standby site, which is remotely located from a primary site. The method comprises a first step of computing a difference between an active data file and an archive data file to produce a delta image at the primary site. Another step is transmitting the active data file and the delta image, separately in time sequence, from the primary site to a standby site. A final step is combining the delta image with the active data file at the standby site, to produce an archive data file. An advantage of this method is the creation of a standby data processing system, while using a lower bandwidth to create this additional site.

20 Claims, 4 Drawing Sheets

RECREATION OF ARCHIVES AT A DISASTER RECOVERY SITE

TECHNICAL FIELD

The present invention relates generally to disaster recovery for online computer systems. More particularly, the present invention relates to the creation of a standby data processing site at a remote location using reduced communication bandwidth mirroring.

BACKGROUND

In recent years, the use of networked computer software and the Internet has brought about a significant increase in the amount of network traffic and transactions performed by software applications residing on remote servers. More information is stored by these networked applications and in remote database applications than ever before. These applications process a large number of purchase transactions, credit card transactions, electronic mailing lists, email functions, data distribution, batch processing, etc. These systems contain very critical data and it must be backed up so that the information is not lost. Further, application end users also desire that networked applications and data should be available 24 hours a day and 7 days a week.

To provide robust services that are constantly available, computer systems must have redundant backup systems. It is inevitable that the primary system will fail on occasion. When the primary system fails, a backup system must be quickly available. A backup system can be located on-site with the primary system and then a secondary backup system can be located at a physically remote backup site. Having at least one backup system on-site is valuable because the networked application can immediately failover to that application, if the primary system becomes inoperative. This fast failover will be transparent to the user because it is local.

A second backup system at a remote site is desirable because it protects against catastrophic failure at the primary site. This is sometimes called the standby site. If the primary site is disabled by an extended power outage, fire, or flood then the remote standby system will be activated. A failover to an off-site standby system is slower, but it provides a maximum amount of protection against total system failure. Specifically, this type of fail safe system is valuable for applications that are connected to the Internet which need to be constantly available.

Many online, transaction based systems store more than one copy of their data. This is another safeguard against system failure or data corruption. The first copy is an original copy and the second is an archival copy. The archival copy is a backup but other times it is used for error checking purposes. Some systems can even store multiple backup copies.

For certain transactional systems, such as a database, an active transaction log is kept which tracks recent transactions. An archive log is then kept to store information from the active log after the active log has been filled or a certain time period has passed. To be able to mirror a transactional system between the primary site and the standby site both the active logs and then the archive logs must be transferred to the standby system. The active logs are then entered into or applied to the standby system which constantly keeps the standby system current.

In the event of a failure, the standby system is always ready to take over. Usually, the standby system is located in another building or in a geographically remote area. This requires the active logs, archive logs, or backups to be transferred across a wide area network (WAN), which is relatively slow in comparison to a local area network (LAN) or a high speed cluster connection. As a result, the data sent from the primary site across the WAN to the standby site can cause a significant amount of network congestion. Especially where these files can contain hundreds of megabytes of data per file.

SUMMARY OF THE INVENTION

This invention provides a method for creating a standby data processing system located at a standby site, which is remotely located from a primary site. The method comprises a first step of computing a difference between an active data file and an archive data file to produce a delta image at the primary site. A second step is transmitting the active data file and the delta image, separately in time sequence, from the primary site to the standby site. A final step is combining the delta image with the active data file at the standby site, to produce a standby archive data file.

In accordance with one aspect of the present invention, the system includes a method for creating archive redo logs for a standby database at a remote location. The method includes the first step of trapping file system transactions using a primary archive log replicator to create an online redo log at the standby database. The next step is computing a difference between an online redo log and archive redo log in the primary database to create a delta image. Then the delta image is transmitted to a standby archive log replicator contained in the standby database.

Another step is combining the delta image with the online redo log in the standby database to create a standby archive redo log on the standby database. The final step is applying the updated archive redo log to the standby database.

Additional features and advantages of the invention will be set forth in the detailed description which follows, taken in conjunction with the accompanying drawings, which together illustrate by way of example, the features of the invention.

DETAILED DESCRIPTION

Figure 1:
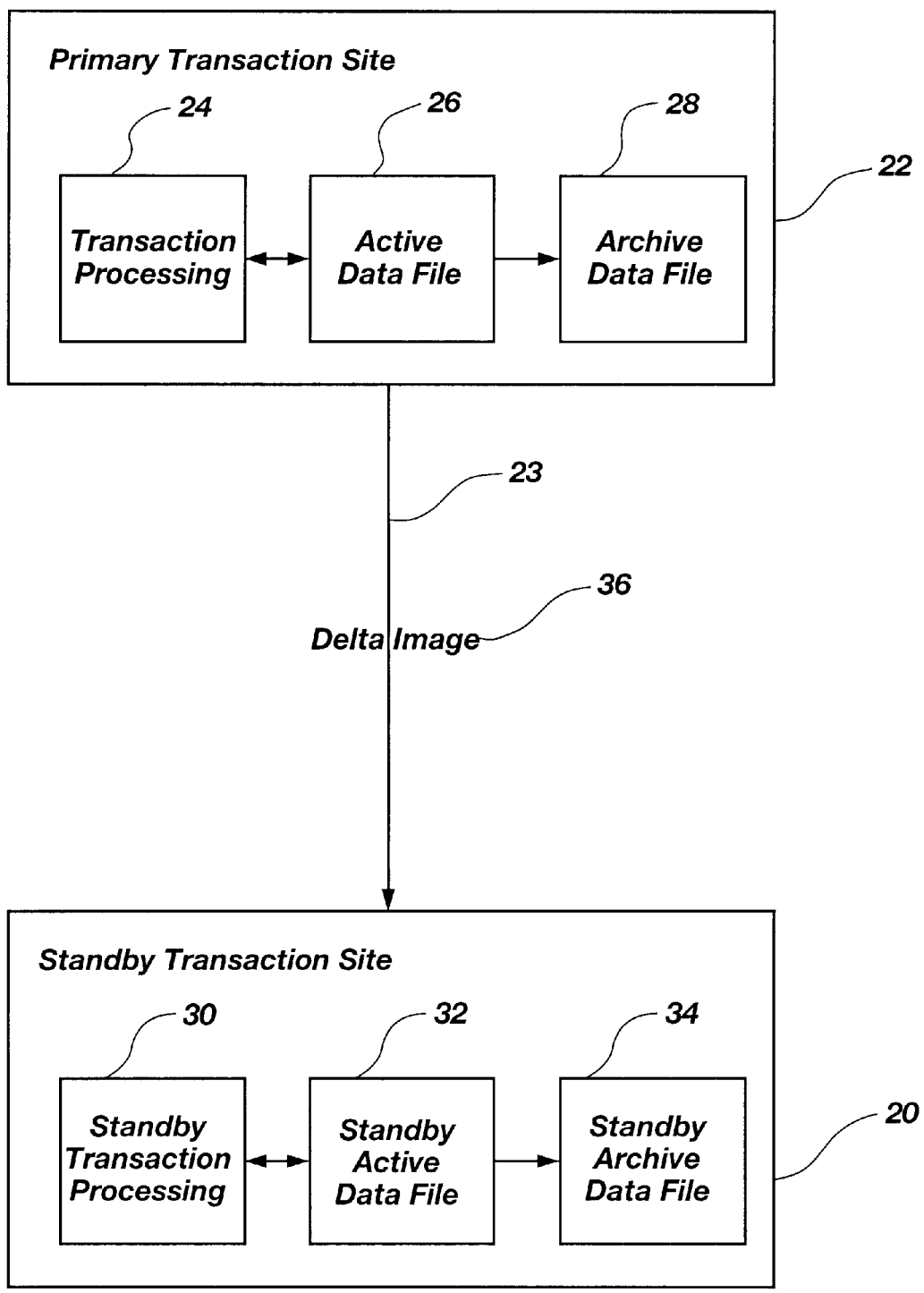
FIG. 1 is a block diagram illustrating the creation of an archive on a standby system.

For the purposes of promoting an understanding the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the invention as illustrated herein, which would occur to one skilled in the relevant art and having possession of this disclosure, are to be considered within the scope of the invention.

FIG. 1 illustrates a device and method for creating archive data files from online data files at a standby site 20. An advantage of this method is the creation of a standby data processing system located at a standby site, while using a lower network bandwidth to create archives at this additional site. This invention provides nearly a 50% savings in network bandwidth as compared to other remote mirroring solutions for transaction based systems. This is because it does not transfer the entire archive file system over the network.

The standby transaction site 20 (standby site) is remotely located from a primary transaction site 22 (primary site) to allow the system to recover from a catastrophic failure at the primary site. A communications link 23 connects the primary site to the standby site. The communications link is typically a wide area network (WAN), but a WAN is typically not as fast as a local area network (LAN) or a fast cluster connection. The communications link can also be a wireless link. The primary site includes a critical computer application which performs transaction processing 24. The transaction processing contains a processing engine and a storage area to store the transactions processed. Transactional applications can include databases, web servers, e-commerce services, and similar transactional based services. Because the primary site contains a critical computer application, it is critical that the overall system does not completely fail. For example, the primary site might fail due to a fire or flood. Not only is it important to have a standby site, but both sites should be constantly synchronized. Then the standby site can take over if the primary site fails and this avoids the loss of data or transactions that were currently taking place. It also means that end users can still access the overall system.

As transactions take place at the primary site 22, an active data file 26 or active log is kept of all the transactions that are performed. If the transaction processing fails at any point in time, then the active data file can be used to later re-apply those transactions. The active data file or active log has a limited size or it may be limited to a certain time period. When the active data file fills up, then it is archived to an archive data file 28.

In a system that has a mirrored standby site 20, the system periodically updates the standby active data file 32 or standby active log. As the standby active log is created, the transactions are rolled forward or applied to the standby transaction processing 30 so that the standby transaction processing contains a current image of what exists at the primary site. Conventional transaction based systems and databases include a managed standby solution that ships only the archive data file (after the active log is filled) over the WAN to the standby site. The problem with this approach is that the transactions that were not yet archived will be lost in a disaster and applications cannot implement a way for transactions to be 2-safe (i.e., reach both sites). In some cases, a third party mirroring system can be used to mirror the entire system or database using synchronous/asynchronous mirroring. The problem with this solution is that the mirroring of the entire database consumes a significant amount of bandwidth on a WAN which is already relatively slow.

The present invention has recognized that it is valuable to compute a difference between an active data file and an archive data file to produce a delta image 36 at the primary site. This delta image is useful because the archive data file is an archive of the active data file and there are large similarities between both files. As mentioned, it consumes a large amount of bandwidth to send the whole archive data file, so is more economical to send a smaller delta image. The delta image is computed by looking at differences in the beginning or ending of the files. This is because large portions of the active data file will be the same as the archive data file. The difference in some situations may only be an archive header, but there can be other important differences. Alternatively, the system can also compare the files to see if there are blocks of additional information within the archive data file. These differences can also be incorporated with the delta image.

Once the delta image has been created, it is transmitted from the primary site to the standby site. The active data file 26 which was shipped to the standby site previously now becomes the standby active data file 32. The delta image is then combined with the standby active data file at the standby site, to produce an archive data file 34. The integration of the two files can be performed using overlay techniques, appending the delta image to the active data file, or applying a decompression algorithm to the delta image.

In an alternative embodiment of the device as shown in FIG. 1, the transaction processing may not contain any storage space and the active data file may be the primary storage system. The primary storage system can then be archived and the same delta image technique can be used to create the archive of the storage system on the standby system.

Figure 2:
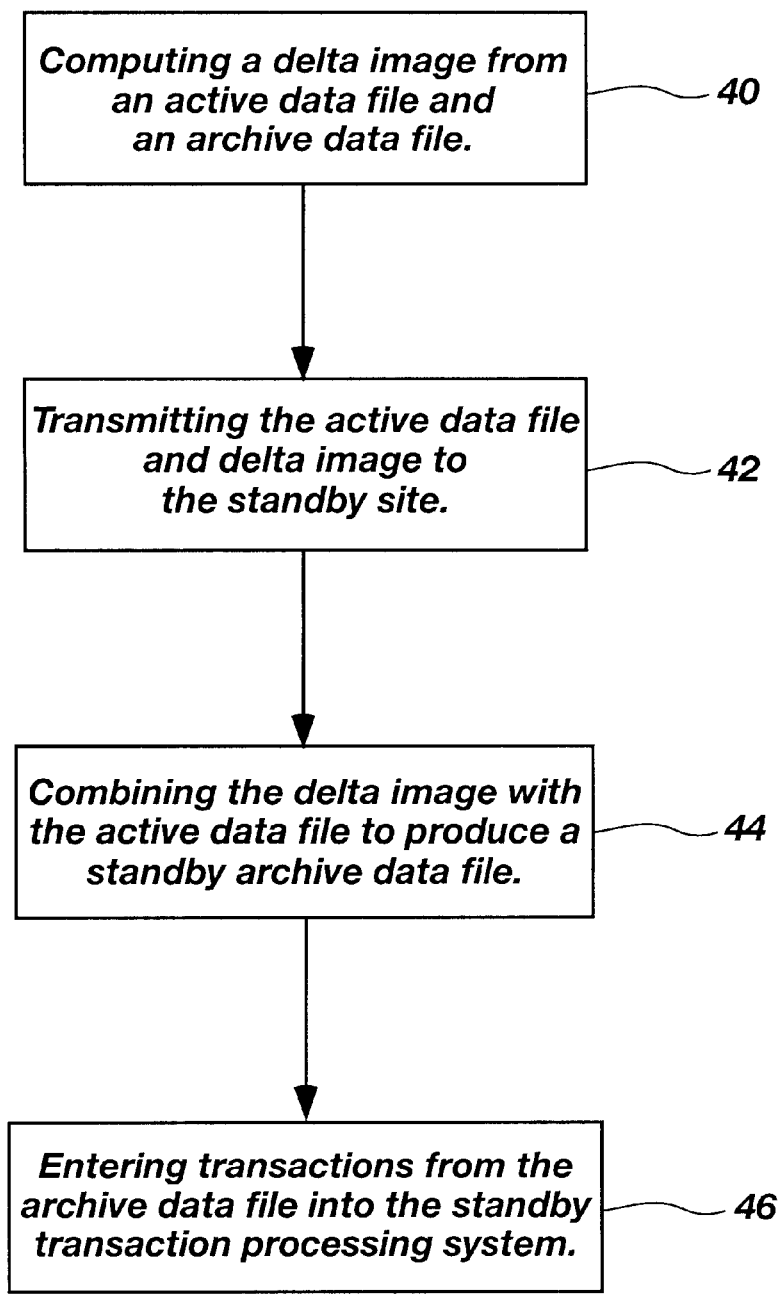
FIG. 2 is a flow chart illustrating the method used to create archive files on a standby system.

FIG. 2 is a flow chart illustrating the method used to create archive files on a standby system. The method comprises a first step of computing a difference between an active data file and an archive data file to produce a delta image at the primary site 40. A second step is transmitting the active data file and the delta image, separately in time sequence, from the primary site to the standby site 42. The next step is combining the delta image with the active data file at the standby site, to produce a standby archive data file 44. A follow-up step is entering transactions from the archive data file into the standby transaction processing system 46.

Figure 3:
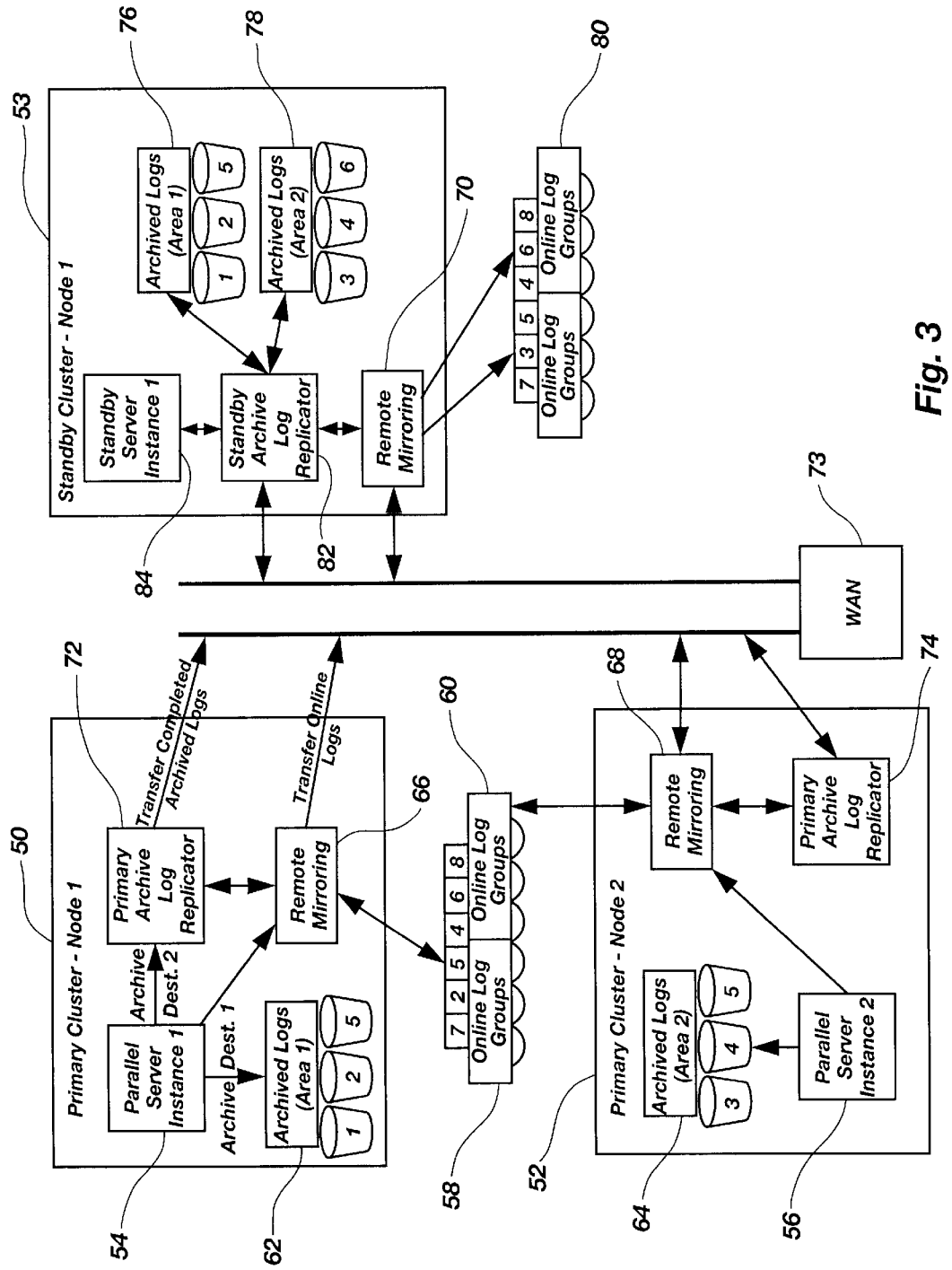
FIG. 3 is a block diagram of a database system with a standby archive system that is created over a wide area network (WAN)

FIG. 3 is a block diagram illustrating one embodiment of this invention. This embodiment describes the use of the present invention to create archives for a database system. The figure also illustrates the interactions involved in replicating archive files across a WAN to a remote standby site or cluster.

The system has a first primary cluster node 50 and a second primary cluster node 52 and these two nodes form a database cluster. A disk subsystem can be shared by these nodes and the nodes can be connected by a high speed local link. Each node has a separate instance of a parallel database server 54, 56 and each node will have its own copy of the online redo logs 58, 60 (i.e., an active data file). As is well known by those skilled in the art, redo log files store all the information needed to perform database recovery and they record every change made to the database structure. When the online redo logs are filled they are then archived and transferred into the archive log areas 62, 64 (i.e., archive data file).

The steps involved in archived redo log replication will now be discussed in further detail. First, the parallel database servers 54, 56 fill up the online redo logs 58, 60 when the transactions commit. Remote mirroring devices 66, 68 trap the disk subsystem writes to the online logs. This trapped information is then sent to the standby remote mirroring device 70 through the remote mirroring or replication transport. A WAN 73 is used to transfer the information between the primary site and the standby site.

The archive systems of the parallel database server 54, 56 archive the filled up online redo logs to two destinations. One archive destination is a local high performance, quick recovery, file system 62 (e.g., VXFS). The other destination is a special file system generally called the archive replicator file system. All opens/writes and closes to this file system are trapped by the primary archive log replicator 72, 74. The archive log replicator ships newly generated online redo log files across to the standby site and asks the standby database to apply it in such a fashion that 2-safeness and data integrity are preserved at all times.

In this invention, the archive files generated at the primary site will be sent to the standby site as a delta image. This is a technique wherein only the difference between the archive log file and the corresponding online redo file is sent across to the standby site. The standby site can recreate the standby archive file using this difference and the mirrored online redo log.

In order to reliably build the archive file at the standby site, and to prevent over-shoots and under-shoots of archive logs versus the online logs (across all types of failures and race condition scenarios), an effective remote mirroring technology must be used. Over-shoot refers to the situation where there can be a gap between what exists in the active logs and the archive logs on the standby site. In contrast, an under-shoot refers to the situation where there are transactions in the archive logs that are ahead in time and sequence to what is available in the active logs. Either of these situations require a system administrator to perform a reset logs when the standby site needs to take over, which causes more data loss (and operator intervention) as the transactions in the active logs are lost on the standby site.

In this mirroring approach, the online redo log is mirrored using asynchronous remote mirroring technology 66, 70. The remote mirroring component can be a UNIX device driver that works by trapping all operating system writes for a storage device and mirroring these writes across disks on remote systems. The most effective type of remote mirroring component preserves write ordering across all writes from the primary cluster to the standby cluster. It should be pointed out that the delta image may use remote procedure calls (RPC) to ship the delta image to the standby site.

The remote mirroring technology is used to remotely mirror online redo logs from the primary cluster running the parallel database server. The primary archive log replicator 72, 74 traps all the archive writes on all the nodes of the primary site. It then computes the difference between the archive redo log and the corresponding online redo log (which can differ only by a few bytes) and sends only this difference over the network to the standby site archive file replicator 82. The delta image difference in some situations may only be an archive header but there can be other important differences.

The standby archive log replicator 82 checks with the remote mirroring component 70 to confirm whether the corresponding online redo log has been completely mirrored. The communication between the standby archive log replicator and the remote mirroring device is completed using replication handles. Replication handles help track the progress of the mirror writes on standby site as compared to the writes on the primary site. The replication handles are sequence numbers which the remote mirroring component uses to sequence every write on the primary site and to track progress on the standby site.

The archive log replicator 82 at the standby site coordinates with the standby site=s remote mirroring component 70 and re-creates the archive redo log 76, 78 from the corresponding online redo log(s) 80 which are mirrored on the standby site.

One method of handling the delta image and creation of the archive log files 76, 78 on the standby site will now be described. After the standby remote mirroring device 70 indicates the completion of mirroring (through the replication handles), the standby archive log replicator copies the standby online redo log corresponding to the delta archive image and overlays this delta image to create the archive. This new archive is stored in a temporary place until the primary archive log replicator 72 sends a message indicating archive completion at the primary. The primary archive log replicator signals completion of the new standby archive redo log by checking with the database system using database queries for archive completion.

After the creation of the standby archive redo log 76, the standby archive log replicator 82 checks with the corresponding database (through queries) to decide whether the archiving is complete. If the archive log is complete, the standby archive file replicator proceeds with applying the completed archive to the standby database sever 84. The database does this by creating a link to the file in the archive destination where the standby database is looking for files. Another advantage of this invention is that it prevents over-shoots, under-shoots, or out-of-order writes. This ensures that the standby site can be used as the primary site when necessary without the need for resetting the standby logs. As mentioned, resetting the active logs causes data loss because the data in the active logs is ignored by the database system.

If for some reason (say due to WAN outages or high congestion) the archive log delta images cannot be shipped and the number of unarchived but the completed online redo logs reach a threshold, the primary archive replicator enters catch-up mode. The threshold can be defined as when the a spool buffer in the remote mirroring device is filled or when the archiving becomes slow enough (due to WAN delay or outages) that there is a risk of the primary database system blocking because it cannot archive the active log files. In catch-up mode, the delta images are discarded and the whole completed archive redo log images are shipped asynchronously. Of course, the primary parallel database server continues to generate archives during the network outage. However, shipping delta images to the second destination or the standby site is deferred, until the primary archive file replicator is able to ship all the pending archive redo logs to the standby site and re-enter normal mode.

On entering catch-up mode, the primary archive replicator automatically asks the remote mirroring device to pause the remote mirroring. This ensures that the online never overshoots the archives. Including a catch-up mode allows this system to withstand WAN outages of long duration without sacrificing the operation performance of the primary site.

Figure 4:
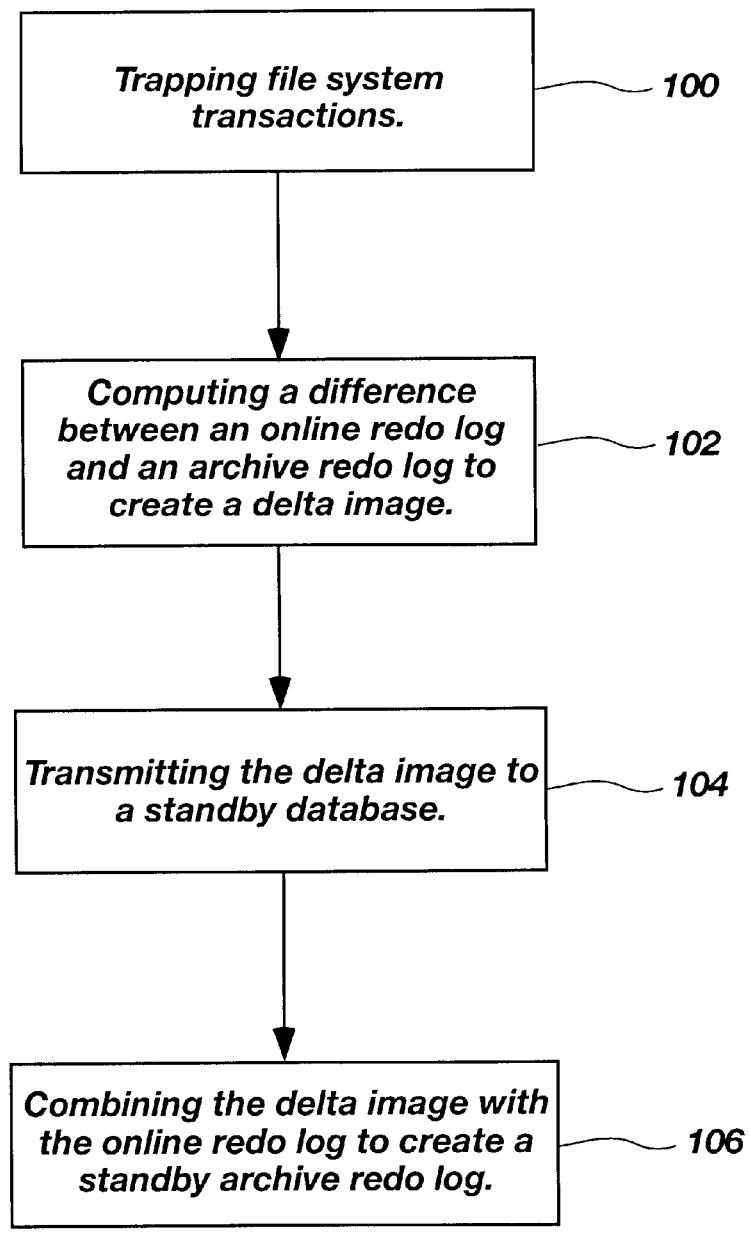
FIG. 4 is a flow chart illustrating the steps used to create archive files in a database system.

FIG. 4 is a flow chart illustrating a summary of the steps used to create archive files in a database system. The method for creating archive redo logs for a standby database at a remote location includes several steps. The first step is trapping file system transactions or active log writes using a remote mirroring device capable of mirroring the log writes to a standby site 100. This creates an online redo log at the standby site. The next step is computing a difference between an online redo log and archive redo log to create a delta image at a primary database 102. Another step is transmitting the delta image to a standby archive log replicator contained in the standby database 104. The last step is combining the delta image with the online redo log to create a standby archive redo log on the standby database 106.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in function, manner of operation, use, and specific implementation may be made, without departing from the concepts of the invention as set forth in the claims.

What is claimed is:

1. A method for creating a standby data processing system located at a standby site, which is remotely located from a primary site, comprising the steps of:
    (a) computing a difference between an active transaction redo log and an archive transaction redo log to produce a delta image at the primary site;
    (b) transmitting the active transaction redo log and the delta image, separately in time sequence, from the primary site to the standby site; and
    (c) combining the delta image with the active transaction redo log at the standby site, to produce a standby archive transaction redo log.

2. A method as in claim 1, further comprising the step of storing the standby archive transaction redo log on the standby site.

3. A method as in claim 1, further comprising the step of storing transactions in the standby active transaction redo log as they are trapped at the primary site.

4. A method as in claim 1, further comprising the step of entering transactions from the archive transaction redo log into the standby transaction processing system.

5. A method for creating archive redo logs for a standby database at a remote location, comprising the steps of:
    (a) trapping active log writes using a remote mirroring device that is capable of mirroring the log writes to a standby site, to create an online redo log at the standby site;
    (b) computing a difference between an online redo log and archive redo log to create a delta image at a primary database, wherein the delta image includes an archive header;
    (c) transmitting the delta image to a standby archive log replicator contained in the standby database; and
    (d) combining the delta image and archive header with the online redo log to create a standby archive redo log on the standby database.

6. A method as in claim 5, further comprising the step of applying the standby archive redo log by creating links to the standby archive redo log.

7. A method as in claim 5, further comprising the step of transmitting the delta image to a standby archive log replicator using a first remote mirroring device in the primary database and a second remote mirroring device in the standby database.

8. A method as in claim 7, further comprising the step of using replication handles to track the progress of mirror writes on the standby database as compared to the primary database.

9. A method as in claim 8, further comprising the step of checking the primary database queries using the archive log replicator to determine whether archiving is complete.

10. A method as in claim 5, further comprising the step of shipping an entire archive redo log from the primary archive log replicator to the standby archive log replicator asynchronously after archiving becomes slow enough that there is a risk of primary database blocking.

11. A method as in claim 10, further comprising the step of shipping an entire archive redo log from the primary archive log replicator to the standby archive log replicator asynchronously when a spool buffer in a remote mirroring system has been filled.

12. A method for creating archive redo logs from a primary database, for a standby database at a remote location, comprising the steps of:
    (a) trapping file system transactions to create an online redo log at the standby database;
    (b) computing a difference between an online redo log and archive redo log in the primary database to find the delta image of the archive redo log;
    (c) transmitting the delta image to a standby database; and
    (d) combining the delta image with the online redo log in the standby database to create standby archive redo log on the standby database.

13. A method as in claim 12, further comprising the step of applying the standby archive redo log by creating a link between the standby database and the standby archive redo log.

14. A method as in claim 12, further comprising the step of transmitting the delta image to a standby archive log replicator using a first remote mirroring device in the primary database and a second remote mirroring device in the standby database.

15. A method as in claim 14, further comprising the step of using replication handles to track the progress of mirror writes on the standby database as compared to the primary database.

16. A method as in claim 12, further comprising the step of checking the primary database with database queries using the archive log replicator to determine whether archiving is complete.

17. A method as in claim 12, further comprising the step of shipping an entire archive redo log from the primary archive log replicator to the standby archive log replicator asynchronously after archiving becomes slow enough that there is a risk of the primary database blocking.

18. A method as in claim 12, further comprising the step of shipping the entire archive redo log from the primary archive log replicator to the standby archive log replicator asynchronously when a spool buffer in a remote mirroring system has been filled.

19. A system for creating a standby data processing system located at a standby site, which is remotely located from a primary site, comprising the steps of:
    means for computing a difference between an active data file and an archive data file to produce a delta image at the primary site;
    means for transmitting the active data file and the delta image, separately in time sequence, from the primary site to the standby site; and
    means for combining the delta image with the active data file at the standby site, to produce a standby archive data file.

20. An article of manufacture comprising:
    a computer usage medium having computer readable program code means embodied therein for creating archive redo logs for a standby database at a remote location, the computer readable program code means in said article of manufacture comprising:

computer readable program code means for trapping active log writes using a remote mirroring device that is capable of mirroring the log writes to a standby site, to create an online redo log at the standby site;

computer readable program code means for computing a difference between an online redo log and archive redo log to create a delta image at a primary database;

computer readable program code means for transmitting the delta image to a standby archive log replicator contained in the standby database; and computer readable program code means for combining the delta image with the online redo log to create a standby archive redo log on the standby database.

* * * * *